United States Patent
Klatt et al.

(10) Patent No.: US 9,154,962 B2
(45) Date of Patent: Oct. 6, 2015

(54) METHOD, SYSTEM AND BASE STATION FOR SHARING OR JOINTLY USING A GERAN (GSM EDGE RADIO ACCESS NETWORK) MOBILE RADIO ACCESS NETWORK

(75) Inventors: Axel Klatt, Cologne (DE); Harald Schmitt, Bendorf (DE)

(73) Assignee: DEUTSCHE TELEKOM AG, Bonn (DE)

(*) Notice: Subject to any disclaimer, the term of this patent is extended or adjusted under 35 U.S.C. 154(b) by 140 days.

(21) Appl. No.: 13/379,068

(22) PCT Filed: Jun. 11, 2010

(86) PCT No.: PCT/EP2010/003510
§ 371 (c)(1), (2), (4) Date: Dec. 19, 2011

(87) PCT Pub. No.: WO2010/145779
PCT Pub. Date: Dec. 23, 2010

(65) Prior Publication Data
US 2012/0106504 A1     May 3, 2012

Related U.S. Application Data (60) Provisional application No. 61/218,852, filed on Jun. 19, 2009.

(30) Foreign Application Priority Data

Jun. 19, 2009   (EP) ..................... 09008052

(51) Int. Cl.
*H04W 16/12*   (2009.01)
*H04W 16/14*   (2009.01)
(Continued)

(52) U.S. Cl.
CPC .............. *H04W 16/12* (2013.01); *H04W 72/04* (2013.01); *H04W 16/14* (2013.01); *H04W 72/12* (2013.01)

(58) Field of Classification Search
None
See application file for complete search history.

(56) References Cited

U.S. PATENT DOCUMENTS

| 6,704,572 | B1* | 3/2004 | Whinnett et al. | 455/452.1 |
| 2002/0186710 | A1* | 12/2002 | Alvesalo et al. | 370/468 |

(Continued)

FOREIGN PATENT DOCUMENTS

| CN | 1272295 A | 11/2000 |
| CN | 101406083 A | 4/2009 |

(Continued)

OTHER PUBLICATIONS

European Patent Office, International Search Report in International Patent Application No. PCT/EP2010/003510 (Oct. 5, 2010).

*Primary Examiner* — Ayaz Sheikh
*Assistant Examiner* — Mariela Vidal Carpio
(74) *Attorney, Agent, or Firm* — Leydig, Voit & Mayer, Ltd.

(57) ABSTRACT

A method for sharing or jointly using a GERAN (GSM EDGE Radio Access Network) mobile radio access network by at least a first mobile radio network operator and a second mobile radio network operator includes providing a radio access network for joint use by the at least first and second mobile radio network operators, wherein the radio access network provides at least a first radio frequency channel and a second radio frequency channel, the at least first and second radio frequency channels having each a TDMA frame (Time Division Multiple Access frame) with eight time slots (TS0 to TS7), and associated dedicated time slots of the radio access network with the mobile radio network operators.

11 Claims, 2 Drawing Sheets

(51) Int. Cl.
*H04W 72/04* (2009.01)
*H04W 72/12* (2009.01)

(56) References Cited

U.S. PATENT DOCUMENTS

| | | |
|---|---|---|
| 2004/0176075 A1* | 9/2004 | Schwarz et al. ............ 455/414.1 |
| 2004/0192360 A1 | 9/2004 | Tsai et al. |
| 2007/0121539 A1 | 5/2007 | Kikuchi |
| 2007/0161373 A1* | 7/2007 | Klatt ............................ 455/434 |
| 2008/0227441 A1* | 9/2008 | Hermel et al. ............. 455/422.1 |
| 2009/0316656 A1* | 12/2009 | Zhao et al. .................... 370/331 |
| 2009/0318136 A1 | 12/2009 | Dillinger et al. |
| 2012/0026961 A1* | 2/2012 | Pittmann et al. .............. 370/329 |

FOREIGN PATENT DOCUMENTS

| | | |
|---|---|---|
| EP | 1037484 A1 | 9/2000 |
| JP | 09307691 A | 11/1997 |
| WO | WO 9917575 A1 | 4/1999 |
| WO | WO 2005013583 A2 | 2/2005 |
| WO | WO 2005039211 A1 | 4/2005 |
| WO | WO 2006037128 A2 | 4/2006 |
| WO | WO 2008112688 A1 | 9/2008 |

* cited by examiner

METHOD, SYSTEM AND BASE STATION FOR SHARING OR JOINTLY USING A GERAN (GSM EDGE RADIO ACCESS NETWORK) MOBILE RADIO ACCESS NETWORK

CROSS-REFERENCE TO RELATED APPLICATIONS

This patent application is a national stage entry under 35 U.S.C. §371 of International Application No. PCT/EP2010/003510, filed Jun. 11, 2010, and claims priority to European Patent Application No. EP09008052.4, filed Jun. 19, 2009, and U.S. Provisional Patent Application No. 61/218,852 filed Jun. 19, 2009. The International Application was published in English on Dec. 23, 2010 as International Publication Number WO 2010/145779 A1.

FIELD

The present invention relates to a method, a system and a base station that allows several mobile network operators to share and/or jointly use a radio access network of a mobile radio system.

BACKGROUND

Several reasons (for example financial or regulatory) nowadays force mobile radio operators to efficiently utilize, jointly operate or share parts of the infrastructure for providing mobile radio services. In this respect, national roaming agreements are known, where the mobile radio subscribers of one mobile radio operator are permitted to use the mobile access network and also the core network of the respective roaming partner.

A method for several mobile network operators to jointly use a radio access network is described in international patent application WO 2005/013583 A2. This method requires that the mobile device selects the PLMN (Public Land Mobile Network) in a way different to the PLMN selection implemented in many (older) mobile devices (hereinafter also called mobile terminals) according to the GSM/GERAN standard which means that older GERAN mobile terminals cannot be used or only used according to a restricted mode of operation. Especially, the method according to international patent application WO 2005/013583 A2 requires a mobile device to actively transmit the PLMN identifier (Public Land Mobile Network identifier) information of the chosen mobile network operator to the base station whereas older GERAN mobile terminals conduct the PLMN selection according to a frequency selection (of a radio frequency channel).

At present, GERAN (GSM EDGE Radio Access Network) mobile radio access networks are the dominant standard for mobile radio networks. However, mobile radio networks are progressively modernized in order to comply with next generation mobile radio network standards such as NGMN (Next Generation Mobile Network) or LTE (Long Term Evolution)/E-UTRAN (Evolved Universal Terrestrial Radio Access Network). Even in the case a mobile radio network operator has successfully migrated its clients from GERAN networks to networks of the next generation, the need will persist to provide mobile radio network services according to the GERAN standard.

SUMMARY

In an embodiment, the present invention provides a method for sharing or jointly using a GERAN (GSM EDGE Radio Access Network) mobile radio access network by at least a first mobile radio network operator and a second mobile radio network operator. The method includes providing a radio access network for joint use by the at least first and second mobile radio network operators, wherein the radio access network provides at least a first radio frequency channel and a second radio frequency channel, the at least first and second radio frequency channels having each a TDMA frame (Time Division Multiple Access frame) with eight time slots (TS0 to TS7), wherein the first radio frequency channel has at least one first dedicated time slot, wherein the second radio frequency channel has at least one second dedicated time slot, and wherein the first and second radio frequency channels respectively have a plurality of shared time slots, the shared time slots being shared between the first and second mobile radio network operator. The at least one first dedicated time slot is permanently associated to the first mobile radio network operator. The at least one second dedicated time slot is permanently associated to the second mobile radio network operator.

DETAILED DESCRIPTION

In an embodiment, the present invention provides a method, a system and a base station for sharing or jointly using a radio access network to provide a GERAN, functionality that allows for a compatibility with older mobile devices while reducing the capacity needs with respect to the radio spectrum needed for that service and enhancing the efficiency of the use of the radio resources.

In an embodiment, the present invention provides a method, a system and a base station for sharing or jointly using a GERAN mobile radio access network by at least a first mobile radio network operator and a second mobile radio network operator, the method comprising the steps of providing a radio access network for joint use by the at least first and second mobile radio network operators, wherein the radio access network provides at least a first radio frequency channel and a second radio frequency channel, the at least first and second radio frequency channels having each a TDMA frame (Time Division Multiple Access frame) with eight time slots, wherein the first radio frequency channel has at least one first dedicated time slot, the at least one first dedicated time slot being permanently associated to the first mobile radio network operator, wherein the second radio frequency channel has at least one second dedicated time slot, the at least one second dedicated time slot being permanently associated to the second mobile radio network operator, and wherein the first and second radio frequency channels respectively have a multitude of shared time slots, the shared time slots being shared between the first and second mobile radio network operator.

It is thereby advantageously possible that the capacity needs for mobile radio network functionality according to the GERAN, standard can be reduced and that to free such radio spectrum capacity (used for of mobile radio network functionality according to the GERAN, standard) for mobile radio network functionality according to next generation standards. It is furthermore advantageously possible to provide a common (or shared) radio access network for mobile communication which can be used by a plurality of mobile radio operators, i.e. at least a first mobile radio network operator and a second mobile radio network operator. Furthermore, it is advantageous that radio resources or radio spectrum capacities are dynamically shared between the plurality of radio network operators. In the following, the term GERAN standard is used with the meaning of the relevant standards of the radio air interface of such a GSM or EDGE radio access network.

In accordance with the GERAN standard, the mobile station selects the first and second (or more) radio network operator by selecting an appropriate carrier frequency related (in a predetermined relationship) to the first or second (or more) radio frequency channel. This means that the transmission of a PLMN identifier information from the mobile device to the base station does not necessarily need to occur for the purpose of indication of the PLMN selection. In an embodiment, the selection of the mobile radio network operator (out of a plurality of mobile radio network operators like a first, second, etc. operator) is based on the predetermined assignment of a corresponding PLMN identifier to a specific radio frequency channel according to the GERAN standard.

According to one alternative embodiment, the time slots of each of the first and second radio frequency channels comprise one dedicated time slot—one first dedicated time slot in the first radio frequency channel and one second dedicated time slot in the second radio frequency channel—and seven shared time slots. According to another alternative embodiment, the time slots of each of the first and second radio frequency channels comprise two dedicated time slots (and preferably exactly two dedicated time slots)—two first dedicated time slots in the first radio frequency channel and two second dedicated time slots in the second radio frequency channel—and six shared time slots. Thereby, it is advantageously possible to use the PLMN selection implemented in older mobile devices according to the GERAN standard (i.e. PLMN selection by means of a frequency selection rather than a dedicated indication of the chosen PLMN) and to use only a small part (namely the dedicated time slots which represent (for the radio frequency channels transmitting a BCCH channel) one out of eight time slots or two out of eight time slots) of the radio frequency capacity of the mobile network fixedly dedicated to a predetermined mobile radio network operator. This enhances greatly the possible flexibility and efficiency in the use of the radio resources of the radio access network.

According to the one alternative embodiment of the present invention, only one time slot out of eight time slots of a TDMA frame is (fixedly) dedicated to a mobile radio network operator, whereas according to the another alternative embodiment, two time slots out of eight time slots are (fixedly) dedicated to a mobile radio network operator. Therefore, the first radio frequency channel comprises in the one alternative embodiment one first dedicated time slot and the second radio frequency channel comprises in the one alternative embodiment one second dedicated time slot. In the another alternative embodiment, the first radio frequency channel comprises two first dedicated time slots and the second radio frequency channel comprises two second dedicated time slots. All the residual time slots are shared time slots. For the first and second radio frequency channels (i.e. the ones defining mobile radio network operators and therefore being related to PLMN identifiers), this means that seven time slots (out of eight) can be shared between different mobile radio network operators according to the first embodiment. For the second embodiment, six (out of eight) time slots can be shared on the first and second radio frequency channel. According to further embodiments of the present invention, it is also possible and can be preferred to use three dedicated time slots (TS0, TS1, TS2) (and five shared time slots (TS3 to TS7) or four dedicated time slots (TS0 to TS3) and four shared time slots (TS4 to TS7) on such first and second radio frequency channels (i.e. the ones defining mobile radio network operators and therefore being related to PLMN identifiers).

The following embodiments refer to all above mentioned embodiments of the present invention.

According to an embodiment, the radio access network for joint use by the at least first and second mobile radio network operators comprises at least a third radio frequency channel, the third radio frequency channel having a TDMA frame (Time Division Multiple Access frame) with eight time slots, wherein all of the time slots of the third radio frequency channel are shared between the first and second mobile radio network operator. According to this embodiment, it is advantageously possible to provide further shared network capacity on additional radio frequency channels that are not used to define a mobile radio network operator (such as the first and second radio frequency channels which are associated to a radio network operator, respectively).

According to an embodiment, the shared time slots (of either the first, second or third radio frequency channels) can be used in a communication for the first mobile radio network operator or for the second mobile radio network operator. This means that in a first point in time any of these shared time slots can be used, e.g., for a communication for the first mobile radio network operator and in a second point in time, e.g., for a communication for the second mobile radio network operator, or vice versa.

According to an embodiment, the first radio frequency channel and the second radio frequency channel are both radio frequency channels transmitting a logical BCCH (Broadcast Control CHannel), the BCCH of the first radio frequency channel comprising a PLMN identifier (Public Land Mobile Network identifier) of the first mobile radio network operator and the BCCH of the second radio frequency channel comprising a PLMN identifier (Public Land Mobile Network identifier) of the second mobile radio network operator. Thereby, it is advantageously possible to select the mobile radio network operator out of a plurality of mobile radio network operators only by means of the frequency channel chosen by the mobile terminal in the uplink.

Furthermore, in an embodiment, the first dedicated time slot is transmitted in TS0 (Time Slot 0) of the TDMA frame of the first radio frequency channel, wherein the second dedicated time slot is transmitted in TS0 (Time Slot 0) of the TDMA frame of the second radio frequency channel, and wherein the shared time slots are transmitted in TS1 (Time Slot 1) to TS7 (Time Slot 7) of the TDMA frames of the first and second radio frequency channels respectively. Thereby, it is advantageously possible to both realize the PLMN selection according to the GERAN standard in such a way that older mobile terminals can easily select between different mobile radio network operators and share a very large part of the available radio frequency resources (in terms of available time slots of used radio frequency channels).

According to an embodiment, the first dedicated time slots are transmitted in TS0 (Time Slot 0) and TS1 (Time Slot 1) of the TDMA frame of the first radio frequency channel, wherein the second dedicated time slots are transmitted in TS0 (Time Slot 0) and TS1 (Time Slot 1) of the TDMA frame of the second radio frequency channel, and wherein the shared time slots are transmitted in TS2 (Time Slot 2) to TS7 (Time Slot 7) of the TDMA frames of the first and second radio frequency channels respectively. Thereby, it is advantageously possible to provide further signaling capacity which is dedicated to a specific mobile radio network operator.

An embodiment of the present invention further relates to a system for sharing radio resources between at least a first and a second mobile radio network operator.

An embodiment of the present invention further relates to a base station for sharing radio resources between at least a first and a second mobile radio network operator.

An embodiment of the present invention further relates to a data processing software program comprising a program code which performs a method according to the present invention especially when it is executed on a data processing system, e.g. of a mobile radio network base station.

An embodiment of the present invention further relates to a computer program product comprising a computer readable program code which is executable on a data processing system for performing a method according to the present invention.

These and other characteristics, features and advantages of the present invention will become apparent from the following description, taken in conjunction with the accompanying drawings, which describe and illustrate, by way of example, the principles of the invention. The description is given for the sake of example only, without limiting the scope of the invention. The reference figures quoted below refer to the attached drawings.

The present invention is described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

According to an embodiment of the present invention, a more efficient utilization of the infrastructure of mobile radio networks is possible, especially for the situation where a compatibility with an older standard of mobile radio communication has to be assured, e.g., with respect to older mobile devices.

Figure 1:
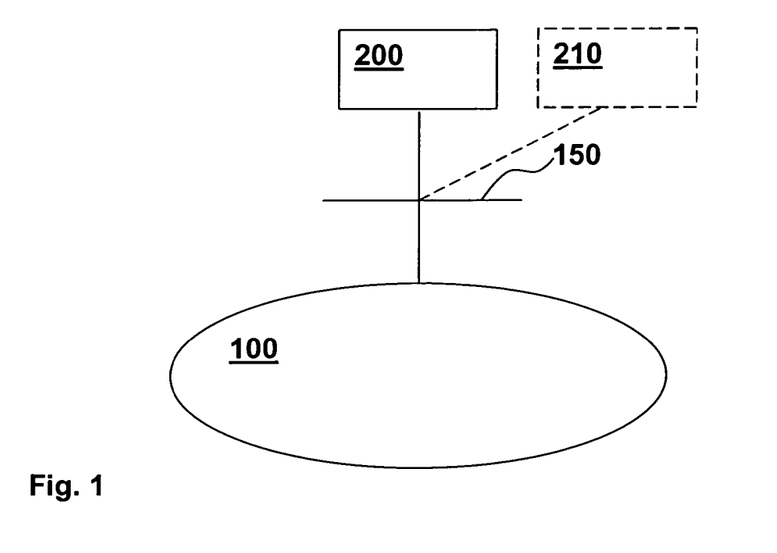
FIG. 1 illustrates schematically an exemplary architecture of a conventional mobile radio network comprising a core network and a radio access network.

In FIG. 1, an exemplary architecture of a conventional mobile radio network comprising a core network 200 and a radio access network 100 is schematically shown. Between the core network 200 and the radio access network 100, a so-called A-interface is provided according to a standard for mobile radio communication such as the GERAN-standard. The method according to an embodiment of the present invention makes it possible to provide a multitude of mobile radio network operators access to a common radio access network shared between the multitudes of mobile radio network operators. The traffic of a mobile device is transmitted by one common radio access network via either one common core network 200 (as represented in FIG. 1 in drawn through lines) or via a plurality of core networks 200, 210 (as represented in FIG. 1 in drawn through and dashed lines). The present invention is a significant improvement over the prior art, because embodiments of the present invention make it possible for a comparably old mobile device (according to the GERAN standard) to use the radio resources of a common radio access network (RAN) of the GERAN standard while the common radio access network and its radio resources is efficiently shared between a multitude of different mobile radio operators. Alternatively the RAN 100 can route all calls to it own CN 200 without the need for the direct routing to 210 via 150.

Figure 2:
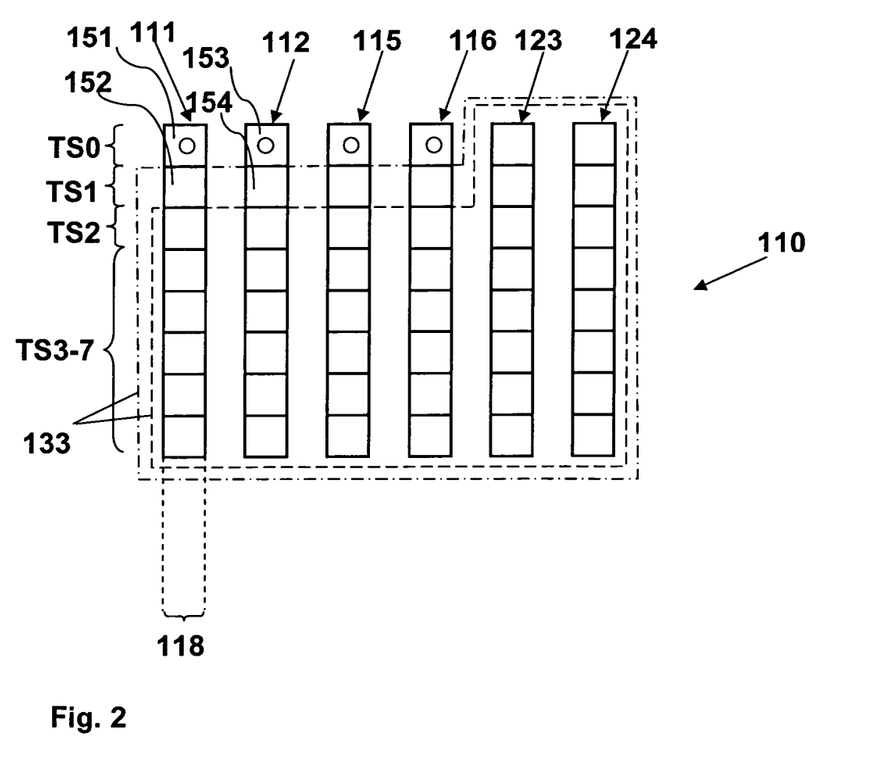
FIG. 2 illustrates schematically the time slots and their use of the TDMA frames of different radio frequency channels of the mobile radio access network.
Figure 3:
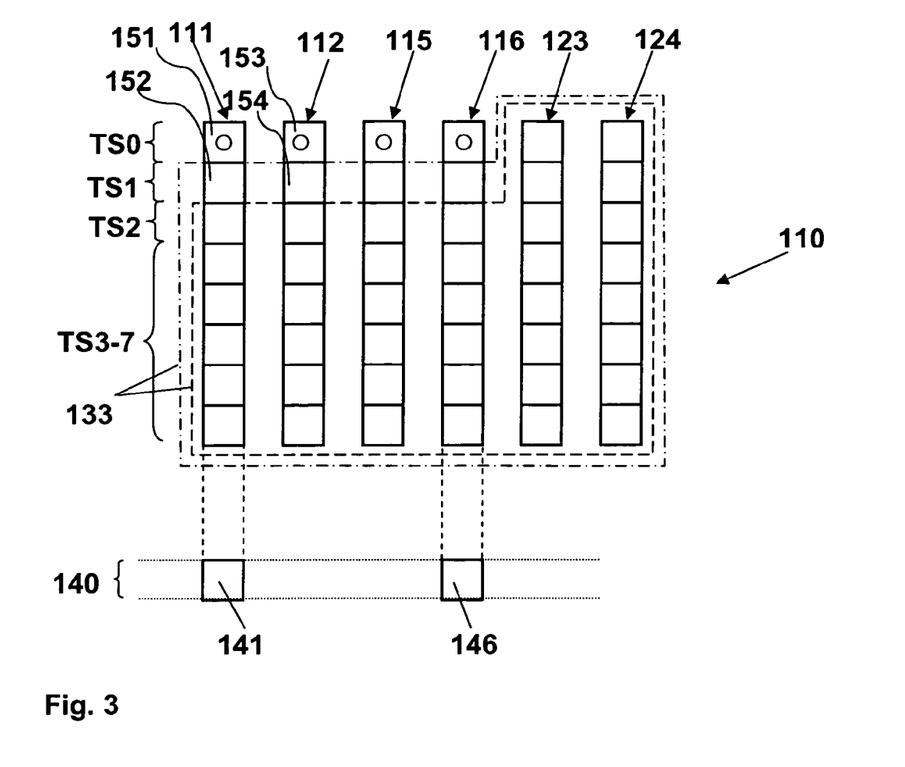
FIG. 3 illustrates schematically the time slots and their use of the TDMA frames of different radio frequency channels as well as the uplink frequency channels of the mobile radio access network.

In FIG. 2, time slots and their use of the TDMA frames of different radio frequency (downlink) channels of the mobile radio access network 100 are schematically shown. In FIG. 3, the (downlink) time slots 110 and their use of the TDMA frames of different radio frequency channels as well as uplink time slots 140 of the mobile radio access network 100 are schematically shown. According to the GERAN standard, the radio frequency channels (or carriers) are spaced by 200 kHz which is schematically represented in FIG. 2 by reference sign 118. FIG. 2 only shows downlink radio channels 110 whereas FIG. 3 also shows time slots 140 of uplink radio channels. According to the GERAN standard, there is a fixed frequency difference (duplex spacing) between each downlink radio frequency channel (or carrier frequency) and the respective uplink radio frequency channel (or carrier frequency), the duplex spacing being e.g. of 45 MHz for GSM 900. Therefore also in such a situation the RAN (Radio Access Network) 100 does know which PLMN is selected (by the mobile terminal) once an uplink radio channel is used by the mobile terminal. In the exemplary embodiment represented in FIGS. 2 and 3, six radio frequency channels, namely a first radio frequency channel 111, a second radio frequency channel 112, a third radio frequency channel 123, a fourth radio frequency channel 124, a fifth radio frequency channel 115, and a sixth radio frequency channel 116, are schematically shown.

In an embodiment, the first to sixth radio frequency channels 111, 112, 123, 124, 115, 116 are not (physically) neighbouring or adjacent radio frequency channels (spaced e.g. by 200 kHz), but radio frequency channels which are at least spaced by 600 kHz (i.e. there are at least two GERAN radio frequency channels (physically) between the first and second radio frequency channel 111, 112 and between the second and third radio frequency channel 112, 123 and between the third and fourth radio frequency channel 123, 124, etc. Each of the radio frequency channels 111, 112, 123, 124, 115, 116 comprise eight TDMA time slots according to the GERAN-standard. The eight time slots (of each of the radio frequency channels 111, 112, 123, 124, 115, 116) are represented in FIG. 2 by means of eight square boxes aligned vertically. According to the GERAN-standard, these eight time slots (time slots TS0 to TS7) of each TDMA frame on each of the radio frequency channels 111, 112, 123, 124, 115, 116 have a duration of approximately 0.577 milliseconds; the TDMA frame (of each of the radio frequency channels 111, 112, 123, 124, 115, 116) having a duration of approximately 4,615 milliseconds.

For each mobile radio network operator sharing the radio access network operated according to the method of the present invention or operated by means of a system or using a base station according to an embodiment of the present invention, a so-called operator associated radio frequency channel

111, 112, 115, 116 is predefined. In an embodiment, the so-called operator associated radio frequency channels 111, 112, 115, 116 are dedicated in a predetermined manner (to a mobile radio network operator) only with respect to a dedicated time slot or time slots, namely, according to a first alternative embodiment of the present invention, the first time slot (TS0) of a TDMA frame, or, according to a second alternative embodiment of the present invention, the first and the second time slot (TS0 and TS1) of a TDMA frame, or, according to further embodiments of the present invention, the first, second and third time slot (TS0 to TS2) or the first, second, third and fourth time slot (TS0 to TS3).

For the first alternative embodiment, the first radio frequency channel 111 comprises only one first dedicated time slot 151 (associated to an operator) and the second radio frequency channel 112 comprises only one second dedicated time slot 153 (associated to another operator). The dedicated time slot or time slots is/are hereinafter also called operator associated time slot or time slots.

For the second alternative embodiment, the first radio frequency channel 111 comprises two first operator associated time slots 151, 152 and the second radio frequency channel 112 comprises two second dedicated time slots 153, 154. On the dedicated time slots of the operator associated radio frequency channels (dedicated time slots 151, 152, 153, 154 for the first and second radio frequency channel 111, 112), an identifier of the respective mobile radio network operator is transmitted. This is represented in FIG. 2 by means of a circle within the first time slot TS0 of the operator associated radio frequency channels 111, 112, 115, 116. The operator associated radio frequency channels comprise, e.g., the first radio frequency channel 111 being assigned to a first mobile radio network operator (e.g. T-Mobile Germany), the second radio frequency channel 112 being assigned to a second mobile radio network operator (e.g. Vodafone Germany), the fifth radio frequency channel 115 being assigned to a third mobile radio network operator (e.g. E+ Germany), and the sixth radio frequency channel 116 being assigned to a fourth mobile radio network operator (e.g. O$_2$ Germany). In an embodiment, not only the first but also the second time slot (TS1) of a so-called operator associated radio frequency channel 111, 112, 115, 116 is a dedicated time slot, i.e. fixedly associated to the mobile radio network operator. This is because the second time slot TS1 is usually used for the SDCCH (Single Dedicated Control CHannel) which carries signalling information associated with the mobile radio network operator identified by the PLMN identity transmitted on the BCCH in the first time slot, TS0. However, it is preferred to not only share the third to the eighth time slot (TS2 to TS7) of the dedicated radio frequency channels 111, 112, 115, 116 but also to share the second time slot (TS1) in accordance with the first alternative embodiment. The shared time slots (TS1 to TS7 according to the first alternative embodiment and TS2 to TS7 according to the second alternative embodiment) are, e.g., used for carrying user data or speech as so-called TCH (Traffic CHannel) channels. The shared time slots are identified collectively by reference sign 133.

The third and fourth radio frequency channels 123, 124 are so-called non-operator-associated radio frequency channels, i.e. all the time slots (TS0 to TS7) of these radio frequency channels are not assigned to a specific mobile radio network operator in a permanent and predefined manner. This means that in a first point in time, each of the time slots (TS0 to TS7) of the third and fourth (and possibly more) radio frequency channels can be used by one of the mobile radio network operators, and in a second point in time, each of the time slots (TS0 to TS7) of the third and fourth (and possibly more) radio frequency channels can be used by another of the mobile radio network operators sharing the network.

According to an embodiment of the present invention, the identifier of the respective mobile radio network operator is the PLMN identity (Public Land Mobile Network identity). In an embodiment, this identifier is transmitted on the logical BCCH channel (Broadcast Control CHannel) within the first time slot (TS0) of the TDMA frames of the dedicated radio frequency channels 111, 112, 115, 116. The operator associated radio frequency channel 111, 112, 115, 116 are therefore also called BCCH-radio frequency channels 111, 112, 115, 116.

According to an embodiment of the present invention, the identifiers (PLMN identity) of all the mobile radio network operators sharing the radio resources of the radio access network need to be transmitted (via the BCCH) to the mobile terminals within reach of the shared (or single) radio access network. The mobile terminal scans and tries to receive the BCCH channel (downlink) on all radio frequencies according to the GERAN standard in the available frequency band in steps of 200 kHz, e.g. 124 GERAN channels in the core GERAN 900 MHz band. In the case of national roaming, a mobile device then detects the identifier of the home operator (HPLMN Home Public Land Mobile Network) out of the multitude of radio network operator identifiers transmitted on the operator associated radio frequency channels 111, 112, 115, 116 (PLMN selection). In the case of international roaming, the mobile device also detects the identifiers of the multitude of radio network operators and an (also user defined) operator choice (PLMN selection) is made which one of the operators is to be used. In the uplink direction, a request to initiate a communication is transmitted from the mobile terminal to the base station using the RACH (Random Access CHannel) on the appropriate and predefined uplink radio frequency channel. According to the GERAN standard, the connection to the selected mobile radio network operator is done by means of selecting the uplink radio frequency channel associated (in a predefined manner with a downlink radio frequency channel transmitting (in time slot 0 via the BCCH) the PLMN identity) with that mobile radio network operator. Examples of two time slots representing the RACH uplink channels 141, 146 of the first and sixth (so-called dedicated) radio frequency channel 111, 116 are schematically shown in FIG. 3.

This means that after PLMN selection (in the mobile device automatically or with (direct or indirect) user interaction), an uplink channel is used by the mobile terminal to provide access to the radio access network. The (frequency of the) uplink channel used by the mobile terminal defines which one of the plurality of mobile radio network operators is to be used. According to the GERAN standard, mobile terminal define the mobile radio network operator (e.g. T-Mobile Germany), i.e. the PLMN identity (e.g. 262-01), by means of using the (predetermined) uplink carrier frequency (e.g. 906.2 MHz) associated with the radio frequency channel 111, 112, 115, 116 (e.g. 951.2 MHz) associated to the selected PLMN. This means that in order to provide compatibility to mobile terminal using this PLMN selection scheme, there is a need to follow this procedure and nevertheless provide a possibility to efficiently share the radio resources of the radio access network. According to the present invention, this is done by means of sharing not only (all) the time slots (TS0 to TS7) of the non-operator-associated radio frequency channels (third and fourth radio frequency channel 123, 124 according to the exemplary embodiment of FIGS. 2 and 3) but also the shared time slots 132 (TS1 to TS7 according to the first alternative embodiment or TS2 to TS7 according to the second alternative embodiment) of the so-called operator-associated radio frequency channels (the first, second, fifth and sixth radio frequency channels 111, 112, 115, 116 according to the exemplary embodiment of FIGS. 2 and 3). This means that all the time slots 133 (e.g. traffic channels TCH) which are enclosed by a dot and dash line (first embodiment) or by a dashed line (second embodiment) in FIGS. 2 and 3 are shared time slots 133 and can be flexibly assigned (or allocated) to one of the plurality of mobile radio network operators in response to, e.g. network load requirements, service level requirements or the like. If the core network is not shared between the mobile radio network operators (i.e. a plurality of core networks 200, 210 are connected to the single radio access network 100, shown in FIG. 1 by both drawn through and dashed lines), the radio resource control (RRC) or radio resource management (RRM) of the base station controller routes the service requests and traffic load to the respective core networks 200, 210 dependant on the mobile radio network operator used, i.e. dependant on the uplink frequency used by the mobile terminal. If the core network 200 is shared (i.e. only one core network 200 is connected to the single radio access network 100, shown in FIG. 1 by drawn through lines), an information regarding the mobile radio network operators chosen by the mobile device (PLMN selection via the appropriate RACH channel) needs to be transmitted to the core network 200. This can either be done by means of an explicit information or by means of operator specific transmission routes.

In an embodiment, the allocation of the shared time slots 133 is realized by means of using the AGCH (Access Grant CHannel) transmitted also on the first time slot TS0, 130 of the (so-called dedicated) radio frequency channels 111, 112, 115, 116. Traffic channels (TCH) can be allocated or assigned by means of SDCCH channels transmitted on shared time slots 133.

The invention claimed is:

1. A method for sharing or jointly using a GERAN (GSM EDGE Radio Access Network) mobile radio access network by at least a first mobile radio network operator and a second mobile radio network operator, the method comprising:
providing, by a radio access network, at least a first radio frequency channel and a second radio frequency channel, the first and second radio frequency channels each having a TDMA frame (Time Division Multiple Access frame) with eight time slots (TS0 to TS7), wherein the first radio frequency channel has at least one first dedicated time slot, wherein the second radio frequency channel has at least one second dedicated time slot, and wherein the first and second radio frequency channels respectively have a plurality of shared time slots, the shared time slots being shared between the first and second mobile radio network operators;
associating, by the radio access network, the at least one first dedicated time slot permanently with the first mobile radio network operator; and
associating, by the radio access network, the at least one second dedicated time slot permanently with the second mobile radio network operator;
wherein the time slots of each of the first and second radio frequency channels comprise one respective dedicated time slot and seven shared time slots; and
wherein the time slots of the first radio frequency channel comprise one dedicated time slot and wherein the first dedicated time slot is time slot 0 (TS0) of the TDMA frame of the first radio frequency channel, wherein the time slots of the second radio frequency channel comprise one dedicated time slot and wherein the second dedicated time slot is time slot 0 (TS0) of the TDMA frame of the second radio frequency channel, and wherein the shared time slots are time slot 1 to time slot 7 (TS1 to TS7) of the TDMA frames of the first and second radio frequency channels respectively.

2. The method according to claim 1, wherein the radio access network further provides at least a third radio frequency channel, the third radio frequency channel having a TDMA frame (Time Division Multiple Access frame) with eight time slots, wherein all of the time slots of the third radio frequency channel are shared between the first and second mobile radio network operators.

3. The method according to claim 2, wherein at least one of the shared time slots of one out of the first, second or third radio frequency channels is used in a communication for the first mobile radio network operator in a first point in time and in a communication for the second mobile radio network operator in a second point in time.

4. The method according to claim 1, wherein the first radio frequency channel and the second radio frequency channel are both radio frequency channels transmitting a logical BCCH (Broadcast Control CHannel), the BCCH of the first radio frequency channel comprising a PLMN identifier (Public Land Mobile Network Identifier) of the first mobile radio network operator and the BCCH of the second radio frequency channel comprising a PLMN identifier of the second mobile radio network operator.

5. A method for sharing or jointly using a GERAN (GSM EDGE Radio Access Network) mobile radio access network by at least a first mobile radio network operator and a second mobile radio network operator, the method comprising:
providing, by a radio access network, at least a first radio frequency channel and a second radio frequency channel, the first and second radio frequency channels each having a TDMA frame (Time Division Multiple Access frame) with eight time slots (TS0 to TS7), wherein the first radio frequency channel has at least one first dedicated time slot, wherein the second radio frequency channel has at least one second dedicated time slot, and wherein the first and second radio frequency channels respectively have a plurality of shared time slots, the shared time slots being shared between the first and second mobile radio network operators;
associating, by the radio access network, the at least one first dedicated time slot permanently with the first mobile radio network operator; and
associating, by the radio access network, the at least one second dedicated time slot permanently with the second mobile radio network operator; and
wherein the time slots of each of the first and second radio frequency channels comprise two respective dedicated time slots and six shared time slots; and
wherein the time slots of the first radio frequency channel comprise two dedicated time slots and wherein the first dedicated time slots are time slot 0 (TS0) and time slot 1 (TS1) of the TDMA frame of the first radio frequency channel, wherein the time slots of the second radio frequency channel comprise two dedicated time slots and wherein the second dedicated time slots are time slot 0 (TS0) and time slot 1 (TS1) of the TDMA frame of the second radio frequency channel, and wherein the shared time slots are time slot 2 to time slot 7 (TS2 to TS7) of the TDMA frames of the first and second radio frequency channels respectively.

6. A system for sharing or jointly using a GERAN (GSM EDGE Radio Access Network) mobile radio access network by at least a first mobile radio network operator and a second mobile radio network operator, the system comprising:
 a radio access network configured to provide at least a first radio frequency channel and a second radio frequency channel, wherein the at least first and second radio frequency channels have each a TDMA frame (Time Division Multiple Access frame) with eight time slots, and wherein the first radio frequency channel has at least one first dedicated time slot, the at least one first dedicated time slot being permanently associated with the first mobile radio network operator, wherein the second radio frequency channel has at least one second dedicated time slot, the at least one second dedicated time slot being permanently associated with the second mobile radio network operator, and wherein the first and second radio frequency channels respectively have a plurality of shared time slots, the shared time slots being shared between the first and second mobile radio network operators;
 wherein the time slots of each of the first and second radio frequency channels comprise one respective time slot and seven shared time slots; and
 wherein the time slots of the first radio frequency channel comprise one dedicated time slot and wherein the first dedicated time slot is time slot 0 (TS0) of the TDMA frame of the first radio frequency channel, wherein the time slots of the second radio frequency channel comprise one dedicated time slot and wherein the second dedicated time slot is time slot 0 (TS0) of the TDMA frame of the second radio frequency channel, and wherein the shared time slots are time slot 1 to time slot 7 (TS1 to TS7) of the TDMA frames of the first and second radio frequency channels respectively.

7. The system according to claim 6, wherein the radio access network is further configured to provide at least a third radio frequency channel, the third radio frequency channel having a TDMA frame (Time Division Multiple Access frame) with eight time slots, wherein all of the time slots of the third radio frequency channel are shared between the first and second mobile radio network operators.

8. The system according to claim 6, wherein the first radio frequency channel and the second radio frequency channel are both radio frequency channels transmitting a logical BCCH (Broadcast Control CHannel), the BCCH of the first radio frequency channel comprising a PLMN identifier (Public Land Mobile Network identifier) of the first mobile radio network operator and the BCCH of the second radio frequency channel comprising a PLMN identifier of the second mobile radio network operator.

9. A system for sharing or jointly using a GERAN (GSM EDGE Radio Access Network) mobile radio access network by at least a first mobile radio network operator and a second mobile radio network operator, the system comprising:
 a radio access network configured to provide at least a first radio frequency channel and a second radio frequency channel, wherein the at least first and second radio frequency channels have each a TDMA frame (Time Division Multiple Access frame) with eight time slots, and wherein the first radio frequency channel has at least one first dedicated time slot, the at least one first dedicated time slot being permanently associated with the first mobile radio network operator, wherein the second radio frequency channel has at least one second dedicated time slot, the at least one second dedicated time slot being permanently associated with the second mobile radio network operator, and wherein the first and second radio frequency channels respectively have a plurality of shared time slots, the shared time slots being shared between the first and second mobile radio network operators;
 wherein the time slots of each of the first and second radio frequency channels comprise two respective dedicated time slots and six shared time slots; and
 wherein the time slots of the first radio frequency channel comprise two dedicated time slots and wherein the first dedicated time slots are time slot 0 (TS0) and time slot 1 (TS1) of the TDMA frame of the first radio frequency channel, wherein the time slots of the second radio frequency channel comprise two dedicated time slots and wherein the second dedicated time slots are time slot 0 (TS0) and time slot 1 (TS1) of the TDMA frame of the second radio frequency channel, and wherein the shared time slots are time slot 2 to time slot 7 (TS2 to TS7) of the TDMA frames of the first and second radio frequency channels respectively.

10. A tangible, non-transient computer-readable medium having computer-executable instructions stored thereon for sharing or jointly using one GERAN (GSM EDGE Radio Access Network) mobile radio access network by at least a first mobile radio network operator and a second mobile radio network operator, the computer-executable instructions, when executed by a processor, performing the steps of:
 providing at least a first radio frequency channel and a second radio frequency channel, the first and second radio frequency channels each having a TDMA frame (Time Division Multiple Access frame) with eight time slots (TS0 to TS7), wherein the first radio frequency channel has at least one first dedicated time slot, wherein the second radio frequency channel has at least one second dedicated time slot, and wherein the first and second radio frequency channels respectively have a plurality of shared time slots, the shared time slots being shared between the first and second mobile radio network operators;
 associating the at least one first dedicated time slot permanently with the first mobile radio network operator; and
 associating the at least one second dedicated time slot permanently with the second mobile radio network operator;
 wherein the time slots of each of the first and second radio frequency channels comprise one respective dedicated time slot and seven shared time slots; and
 wherein the time slots of the first radio frequency channel comprise one dedicated time slot and wherein the first dedicated time slot is time slot 0 (TS0) of the TDMA frame of the first radio frequency channel, wherein the time slots of the second radio frequency channel comprise one dedicated time slot and wherein the second dedicated time slot is time slot 0 (TS0) of the TDMA frame of the second radio frequency channel, and wherein the shared time slots are time slot 1 to time slot 7 (TS1 to TS7) of the TDMA frames of the first and second radio frequency channels respectively.

11. A tangible, non-transient computer-readable medium having computer-executable instructions stored thereon for sharing or jointly using one GERAN (GSM EDGE Radio Access Network) mobile radio access network by at least a first mobile radio network operator and a second mobile radio network operator, the computer-executable instructions, when executed by a processor, performing the steps of:
 providing at least a first radio frequency channel and a second radio frequency channel, the first and second radio frequency channels each having a TDMA frame (Time Division Multiple Access frame) with eight time slots (TS0 to TS7), wherein the first radio frequency channel has at least one first dedicated time slot, wherein the second radio frequency channel has at least one second dedicated time slot, and wherein the first and second radio frequency channels respectively have a plurality of shared time slots, the shared time slots being shared between the first and second mobile radio network operators;

associating the at least one first dedicated time slot permanently with the first mobile radio network operator; and associating the at least one second dedicated time slot permanently with the second mobile radio network operator;

wherein the time slots of each of the first and second radio frequency channels comprise two respective dedicated time slots and six shared time slots; and wherein the time slots of the first radio frequency channel comprise two dedicated time slots and wherein the first dedicated time slots are time slot 0 (TS0) and time slot 1 (TS1) of the TDMA frame of the first radio frequency channel, wherein the time slots of the second radio frequency channel comprise two dedicated time slots and wherein the second dedicated time slots are time slot 0 (TS0) and time slot 1 (TS1) of the TDMA frame of the second radio frequency channel, and wherein the shared time slots are time slot 2 to time slot 7 (TS2 to TS7) of the TDMA frames of the first and second radio frequency channels respectively.

* * * * *